United States Patent
Murray et al.

(10) Patent No.: US 9,592,753 B2
(45) Date of Patent: Mar. 14, 2017

(54) SEAT LATCHING AND STORAGE MECHANISM

(75) Inventors: Timothy Allen Murray, Spirit Lake, IA (US); Stephen Nuemeyer, Davenport, IA (US)

(73) Assignee: AGCO Corporation, Duluth, GA (US)

( * ) Notice: Subject to any disclaimer, the term of this patent is extended or adjusted under 35 U.S.C. 154(b) by 1129 days.

(21) Appl. No.: 13/334,127

(22) Filed: Dec. 22, 2011

(65) Prior Publication Data
US 2012/0292969 A1 Nov. 22, 2012

Related U.S. Application Data
(60) Provisional application No. 61/427,239, filed on Dec. 27, 2010.

(51) Int. Cl.
*B60N 2/30* (2006.01)
*B60N 2/38* (2006.01)

(52) U.S. Cl.
CPC .......... *B60N 2/3011* (2013.01); *B60N 2/3056* (2013.01); *B60N 2/38* (2013.01)

(58) Field of Classification Search
CPC ...... B60N 2/30; B60N 2/3011; B60N 2/3056; B60N 2/38
USPC ....... 296/64, 65.01, 65.05, 65.09, 65.16, 69; 297/14, 15, 335
See application file for complete search history.

(56) References Cited

U.S. PATENT DOCUMENTS

| | | | | |
|---|---|---|---|---|
| 2,642,120 A | * | 6/1953 | Cochran | 297/316 |
| 4,993,666 A | * | 2/1991 | Baymak et al. | 244/122 R |
| 5,374,106 A | * | 12/1994 | Hoefer | 297/236 |
| 5,797,649 A | * | 8/1998 | Snell et al. | 297/14 |
| 5,890,758 A | * | 4/1999 | Pone et al. | 297/15 |
| 6,371,556 B1 | * | 4/2002 | Arai | 297/331 |
| 6,550,854 B1 | * | 4/2003 | Downes | 297/14 |
| 6,572,193 B2 | * | 6/2003 | Downes | 297/335 |
| 6,820,913 B2 | * | 11/2004 | Macey et al. | 296/65.13 |
| 7,654,602 B2 | * | 2/2010 | Smiley et al. | 296/65.16 |
| 7,677,630 B2 | * | 3/2010 | Kanamori et al. | 296/65.01 |
| 7,699,399 B2 | * | 4/2010 | Satta et al. | 297/378.12 |
| 7,976,093 B2 | * | 7/2011 | McBride | 296/65.05 |
| 8,117,279 B2 | * | 2/2012 | Kumar | 709/217 |
| 8,235,445 B2 | * | 8/2012 | Jones et al. | 296/65.03 |
| 8,251,426 B2 | * | 8/2012 | Gerhardt | 296/65.01 |
| 8,328,266 B2 | * | 12/2012 | Yasui et al. | 296/65.01 |
| 2007/0052273 A1 | * | 3/2007 | Satta et al. | 297/378.12 |
| 2008/0100112 A1 | * | 5/2008 | Hausler et al. | 297/331 |

\* cited by examiner

*Primary Examiner* — Gregory Blankenship

(57) ABSTRACT

In an example embodiment, an instructor seat for the cab of an agricultural vehicle is convertible between a sitting condition when the seat is in a forward position and a non-sitting condition when the seat is in a rearward position. The instructor seat may include a seat base and seat back, a conveyor to move the seat between a forward position and a rearward position, and a latch mechanism to place the seat back in a generally vertical position when the seat is in a forward position and force the seat back into a generally horizontal non-sitting position when the seat is in a rearward position.

11 Claims, 2 Drawing Sheets

SEAT LATCHING AND STORAGE MECHANISM

CROSS REFERENCE TO RELATED APPLICATIONS

This application claims the benefit of U.S. Provisional Application Ser. No. 61/427,239, filed Dec. 27, 2010, and entitled "Seat Latching and Storage Mechanism", which is entirely incorporated by reference herein.

FIELD OF THE INVENTION

The invention relates to vehicle seating, and more particularly, to an instructor seat for an agricultural vehicle.

BACKGROUND

There is often little room for an instructor seat in the cab of an agricultural vehicle. In addition, international standards restrict the location of such seats within the cab. For example, ISO 23205 defines a clearance zone for the person in the instructor seat. Various obstacles, may dictate placement of the seat in the cab in order to meet the requirements of ISO 23205. But in some vehicle cabs, the placement of the seat to achieve the desired clearance zone results in the seat becoming an obstacle to ingress and egress. For example, in some cabs the desired clearance zone makes it impractical to put the seat next to or behind the "B" pillar. But if the instructor seat is placed in a position forward of the B-pillar, it becomes an obstacle to cab ingress and egress.

OVERVIEW

Figure 1:
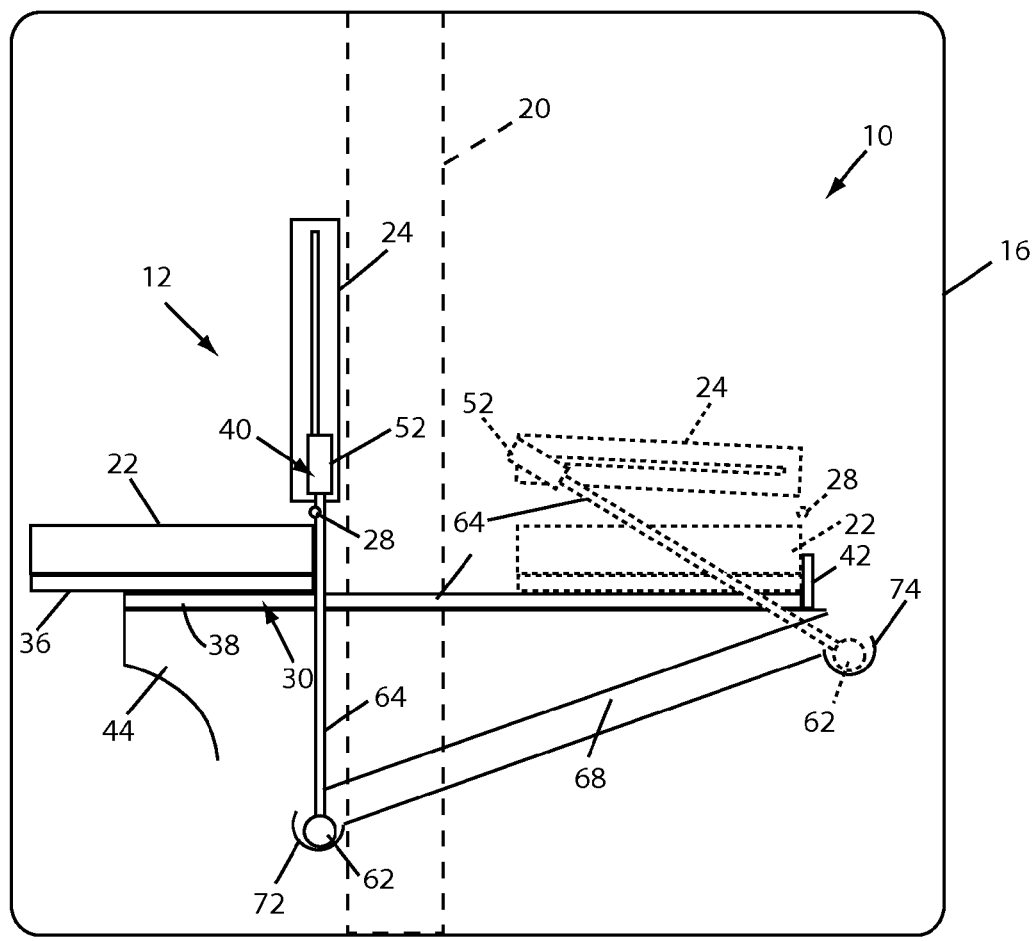
FIG. 1 shows an example embodiment of a seat in a forward position in which the seat is in a sitting condition.

In an example embodiment, an instructor seat is convertible between a sitting condition when in a forward position and a non-sitting condition when in a rearward position. In the example embodiment, the instructor seat is configured for placement in a cab of an agricultural vehicle having. An obstacle in the cab may interfere with a desired clearance zone when the seat is at certain positions in the cab. By way of example, and not limitation, an obstacle is shown in the form of a B-pillar, but it will be recognized that there could be other obstacles in the cab relative to the seat.

In an example embodiment, the seat may be configured to be put into the different sitting conditions relative to an obstacle. This allows the seat to be accessible for sitting by an instructor when the seat is in a position forward of the obstacle and afforded a desired clearance zone and prevents the use of the seat when the seat is not in a forward position, such as when the seat is not afforded a desired clearance zone in accordance with various standards. Thus, the arrangement ensures that the instructor is provided the desired clearance zone when the seat is accessible. In an example embodiment, the seat is placed in a sitting condition when positioned forward of the B-pillar and a non-sitting condition when the seat is positioned rearward of the B-pillar.

In one example embodiment, a seating arrangement includes a seat convertible between a sitting condition and a non-sitting condition, a conveyance system for moving the seat forward and rearward along a longitudinal axis of the cab, and a latch system for controlling the conversion of the seat between the sitting condition and the non-sitting condition in accordance with the seat's location relative to the cab. For example, the seat may be moved between sitting and non-sitting conditions when the seat is moved in different positions relative to an obstacle, such as the cab's B-pillar.

In an example embodiment, the seat includes a seat base configured to support the buttocks of a user sitting on the seat base and a seat back for providing support to a user's back. The seat back may be movable relative to the seat base between a generally upright position which exposes the seat base to allow a user to use the seat base for sitting, described as a sitting condition of the seat herein, and a generally downward position in which the seat back covers the seat base and to make the seat base inaccessible for sitting, referred to herein as a non-sitting condition of the seat.

The conveyance system may comprise a slide arrangement including an upper slide that is coupled to a bottom of the seat base and a lower slide coupled to a seat mount. The upper slide may be slidably moveable with respect to the lower slide such that the seat base may be moved relative to a seat mount in a forward and rearward direction along a longitudinal axis of the vehicle, such as a position forward and aft of a B-pillar of the cab.

In an example embodiment, the latch system comprises a cam arrangement including a cam configured to move along a cam track between a forward position, such as when the seat is positioned forward of an obstacle, and a rearward position, such as when the seat is positioned rearward of the obstacle. The cam track may include a forward slot that is configured to hold the cam member in an upright position in which the latch places the seat back in the upward sitting position and a rearward cam slot for holding the cam in a downward position to force the seatback downward into the non-sitting condition and prevent the latch from placing the seat into the sitting condition. Thus, in an example embodiment is which the obstacle is a B-pillar, the seat is movable between a forward position in front of the B-pillar in which the seat is placed in a sitting condition and a position rearward of the B-pillar in which the seat is forced into and held in a non-sitting condition.

DETAILED DESCRIPTION OF EXAMPLE EMBODIMENTS

As required, example embodiments of the present invention are disclosed. The various embodiments are meant to be non-limiting examples of various ways of implementing the invention and it will be understood that the invention may be embodied in alternative forms. The present invention will be described more fully hereinafter with reference to the accompanying drawings in which like numerals represent like elements throughout the several figures, and in which exemplary embodiments are shown. The figures are not necessarily to scale and some features may be exaggerated or minimized to show details of particular elements, while related elements may have been eliminated to prevent obscuring novel aspects. The specific structural and functional details disclosed herein should not be interpreted as limiting, but merely as a basis for the claims and as a representative basis for teaching one skilled in the art to variously employ the present invention.

Turning to the figures, FIG. 1 shows an example embodiment of an instructor seat arrangement 10 including a seat 12 in the cab 16 of an agricultural vehicle having a B-pillar 20. A conveyor system 30 is provided to move the seat forward and rearward of the B-pillar 20, and a latch system 40 is configured to control the condition of the seat between a sitting condition and a non-sitting condition in accordance with the position of the seat 12 relative to the B-pillar 20.

In the example embodiment, the seat 12 includes a seat base 22 upon which a user may sit and a seat back 24 for supporting a user's back. The seat back 24 may be movably coupled to the seat base 22 so as to rotate about a pivot point 28 between a generally vertical position (FIG. 1) and a generally horizontal position (FIG. 2) to place the seat in a sitting and non-sitting condition, respectively.

In order to provide easy cab ingress and egress, a conveyor arrangement 30 may be provided to allow movement of the seat 12 forward and rearward (left and right in reference to the figures). In the example embodiment, the conveyor arrangement 30 comprises a slide arrangement that includes an upper slide 36 coupled to a bottom of the seat base 22 and a lower slide 38 coupled to a seat mount 44, such as the left hand console of the cab 16. The upper slide 36 may be slidably moveable with respect to the lower slide 38 so that the seat 12 can be moved forward and rearward of the B-pillar by moving the seat base 22 forward and rearward along the lower slide 38. In the example embodiment, movement of the seat 12 forward and rearward is limited by the interaction of the upper 36 and lower slide 38. For example, a stop 42 may be provided which limits the rearward movement of the upper slide 36.

Preferably, the seat 12 is placed in a sitting condition when positioned forward of the B-pillar 20 to provide a desired clearance zone and placed in a non-sitting condition when placed rearward of the B-pillar 20 in which the B-pillar acts as an obstacle to the clearance zone. This helps avoid a situation where a user attempts to sit in the seat 12 located in a position that is in violation of accepted standards. In the example embodiment, a latch system 40 is provided for controlling the condition in response to the seat's relative position to the B-pillar 20. For example, the latch system, allows the seat to be placed in a sitting condition when forward of the B-pillar and forces the seat 12 into a non-sitting position when the seat is positioned rearward of the B-pillar 20.

The latch system 40 may include a latch 52 configured to engage the seat back 24 and releasably hold the seat back 24 in an upright position to thereby place the seat 12 in a sitting condition. The latch 52 may be coupled to a cam 62 by an extension member 64. The cam 62 may be configured to move along a cam track 68 provided in the console 44 of the cab 16. The cam track 68 may include a forward cam slot 72 at a forward end of the cam track 68 and a rearward cam slot 74 provided at a rearward end of the cam track 68. As shown in the figures, the forward cam slot 62 is positioned lower than the rearward cam slot 74 which results in a rotation of extension member 64 as the cam 62 moves along the cam track 68.

The latch system 40 is configured so that when the seat 12 is moved forward of the B-pillar 20 the cam 62 is received in the forward cam slot 72 and extension member 64 is rotated to a generally vertical position in which the latch 52 engages the seatback 24 to hold the seat in the upright position. For example, the latch may be provided with an extension, clip, connector or the like that engages a receiving portion in the seat back.

As shown in FIG. 1, the forward cam slot 72 holds the cam 62 and the extension member 64 generally vertical to hold the seat back 24 in place. To release the seat 12 from the sitting condition the latch may be released by removing the cam 62 from the forward cam slot 72 by pulling upward on the latch 52. This displaces the cam 62 from the forward slot 72.

Figure 2:
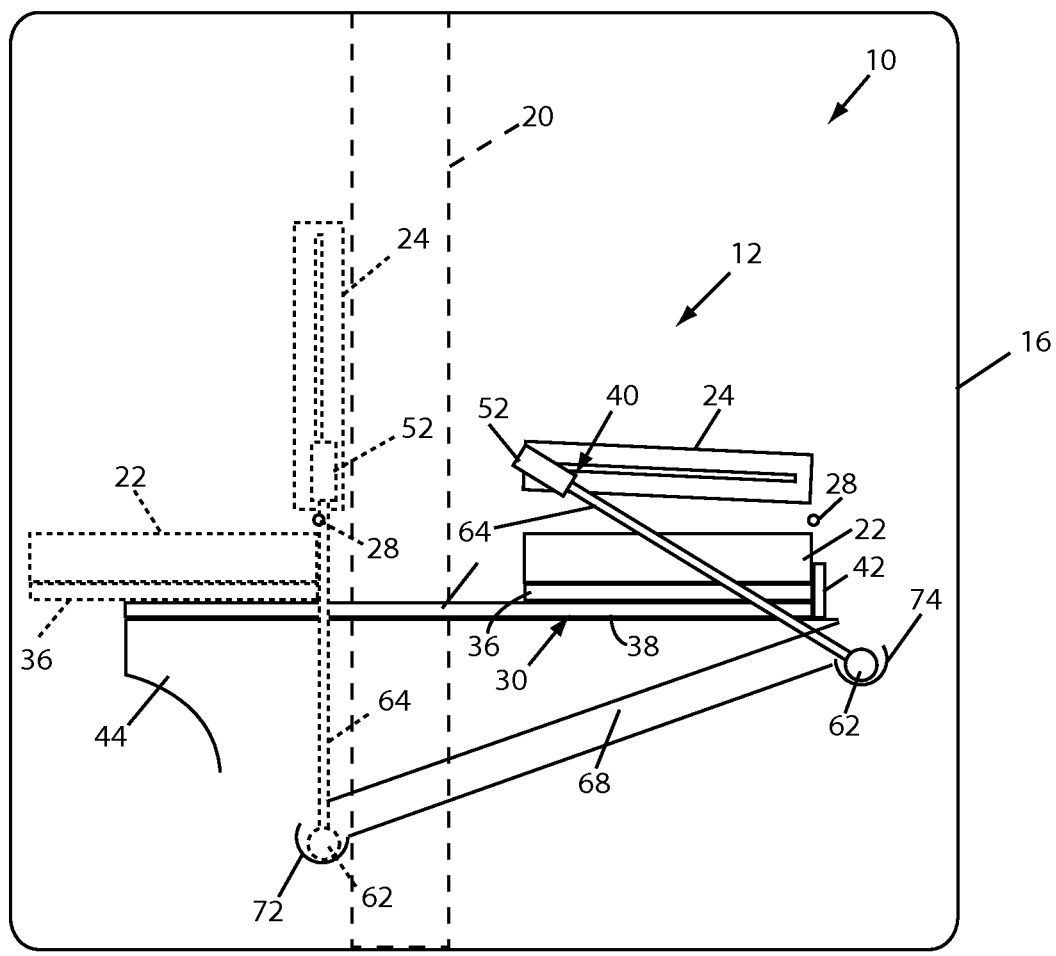
FIG. 2 shows an example embodiment of the seat of FIG. 1 in which the seat is in a rearward position in which the seat is forced into a non-sitting position.

Once the cam 62 is removed from the forward slot 72, the seat base 22 may be moved rearward by sliding the upper slide 36 along the lower slide 38. As shown in the figures, the cam track 68 may angle upward as the cam track extends from the forward cam slot 72 to the rearward cam slot 74 so that as the cam 62 moves rearward along the cam track 68 the latch 52 moves downward to force the seat back 24 downward toward a closed position. As the seat 12 continues to move rearward, the cam 62 is received in the rearward cam slot 74 as shown in FIG. 2 and the seat back 24 is forced further downward into a generally horizontal position to cover the seat base 22 and put the seat 12 in a non-sitting condition. The seat 12 is held in the non-sitting condition until a user removes the cam 62 from the rearward cam slot 74 by pulling upward on the latch 52 or extension member 64 and moves the seat 12 forward in front of the B-pillar 20 to the position shown in FIG. 1. Thus, the present arrangement provides an instructor seat which when positioned forward of the B-pillar 20 is placed in a sitting condition and when moved rearward of the B-pillar 20 is placed in a non-sitting condition.

While the present invention has been described herein with reference to particular embodiments thereof, latitude of modifications, various changes and substitutions is intended in the foregoing descriptions. For example, while in the example embodiment a B-pillar served as an obstacle, there may be other obstacles for which the present arrangement could be useful. It is understood that the invention is not to be limited to the particular terms used in the following claims, but that the invention will include any and all embodiments and equivalents falling within the scope of the appended claims.

What is claimed is:

1. A seat for an agricultural vehicle, comprising:
   a seat configured to be convertible between a sitting condition and a non-sitting condition, wherein the seat is convertible to the sitting condition if the seat is positioned within a cab of the vehicle so as to be afforded a clearance zone about the seat and wherein the seat is held in a non-sitting condition if the seat is positioned so that the seat is not afforded a clearance zone about the seat, wherein a B-pillar of the cab obstructs the occupant's clearance zone in a rearward position of the seat.

2. The seat of claim 1, wherein the seat is configured for movement between a forward position in which the seat is afforded a desired clearance zone and the rearward position in which the seat is not afforded a desired clearance zone.

3. A seat for an agricultural vehicle comprising:
   a seat base and a seat back, the seat back movable with respect to the seat base;
   a conveyor mechanism configured to move the seat between a forward position in which the seat is afforded a clearance zone and a rearward position in which the seat is not afforded a clearance zone; and
   a latch mechanism configured to place the seat back in a sitting condition when the seat is in the forward position and to place the seat back in a non-sitting condition when the seat is positioned in the rearward position, the latch mechanism comprising— a cam,
an extension coupled to the cam,
a latch coupled to the extension and configured to releasably couple to the seat back, and
a cam track configured to force the latch downward when the seat is in a rearward position;

the seat configured to be convertible between a sitting condition and a non-sitting condition, wherein the seat is convertible to the sitting condition if the seat is positioned within a cab of the vehicle so as to be afforded a clearance zone about the seat and wherein the seat is held in a non-sitting condition if the seat is positioned so that the seat is not afforded a clearance zone about the seat.

4. A seat for an agricultural vehicle, comprising:
a seat having a seat base and a seat back, the seat back movable with respect to the seat base;
a conveyor mechanism configured to move the seat between a forward position and a rearward position; and
a latch mechanism configured to configure the seat back in a sitting position when the seat is in the forward position and configure the seat in a non-sitting position when the seat is in the rearward position,
wherein the conveyor mechanism is a slide assembly comprising an upper slide coupled to the seat base and a lower slide coupled to a seat mount.

5. The seat of claim 4, wherein in the forward position the seat is afforded a clearance zone.

6. The seat of claim 4, wherein in the rearward position the seat is not afforded a clearance zone.

7. The seat of claim 4, wherein the seat is an instructor seat.

8. A seat for an agricultural vehicle, comprising:
a seat having a seat base and a seat back, the seat back movable with respect to the seat base;
a conveyor mechanism configured to move the seat between a forward position and a rearward position; and
a latch mechanism configured to configure the seat back in a sitting position when the seat is in the forward position and configure the seat in a non-sitting position when the seat is in the rearward position,
wherein a B-pillar of the cab obstructs a clearance zone when the seat is in the rear position.

9. A seat for an agricultural vehicle, comprising:
a seat having a seat base and a seat back, the seat back movable with respect to the seat base;
a conveyor mechanism configured to move the seat between a forward position and a rearward position; and
a latch mechanism configured to configure the seat back in a sitting position when the seat is in the forward position and configure the seat in a non-sitting position when the seat is in the rearward position, the latch mechanism comprising—
a cam;
an extension coupled to the cam;
a latch coupled to the extension and configured to releasably couple to the seat back; and
a cam track configured to force the latch downward when the seat is in a rearward position.

10. An agricultural vehicle, comprising:
a cab; and
a seat within the cab, the seat convertible to a sitting condition when the seat is positioned within the cab to provide a clearance zone about the seat and a non-sitting condition when the seat is positioned within the cab without a clearance zone,
wherein the cab has a B-pillar and the seat is convertible to a sitting condition when the seat is positioned forward of the B-pillar and the seat is held in a non-sitting condition when the seat is positioned rearward of the B-pillar of the cab.

11. The agricultural vehicle of claim 10, wherein the seat is configure to be placed in a sitting condition when the seat is positioned in a forward position and placed in a non-sitting condition when the seat is positioned in a rearward position.

* * * * *